April 18, 1950 M. SMITH 2,504,232

SELF-LOADING APPARATUS FOR MOTOR TRUCKS

Filed May 18, 1946 3 Sheets-Sheet 1

Inventor
MICHAEL SMITH

By Francis J. Klempay
Attorney

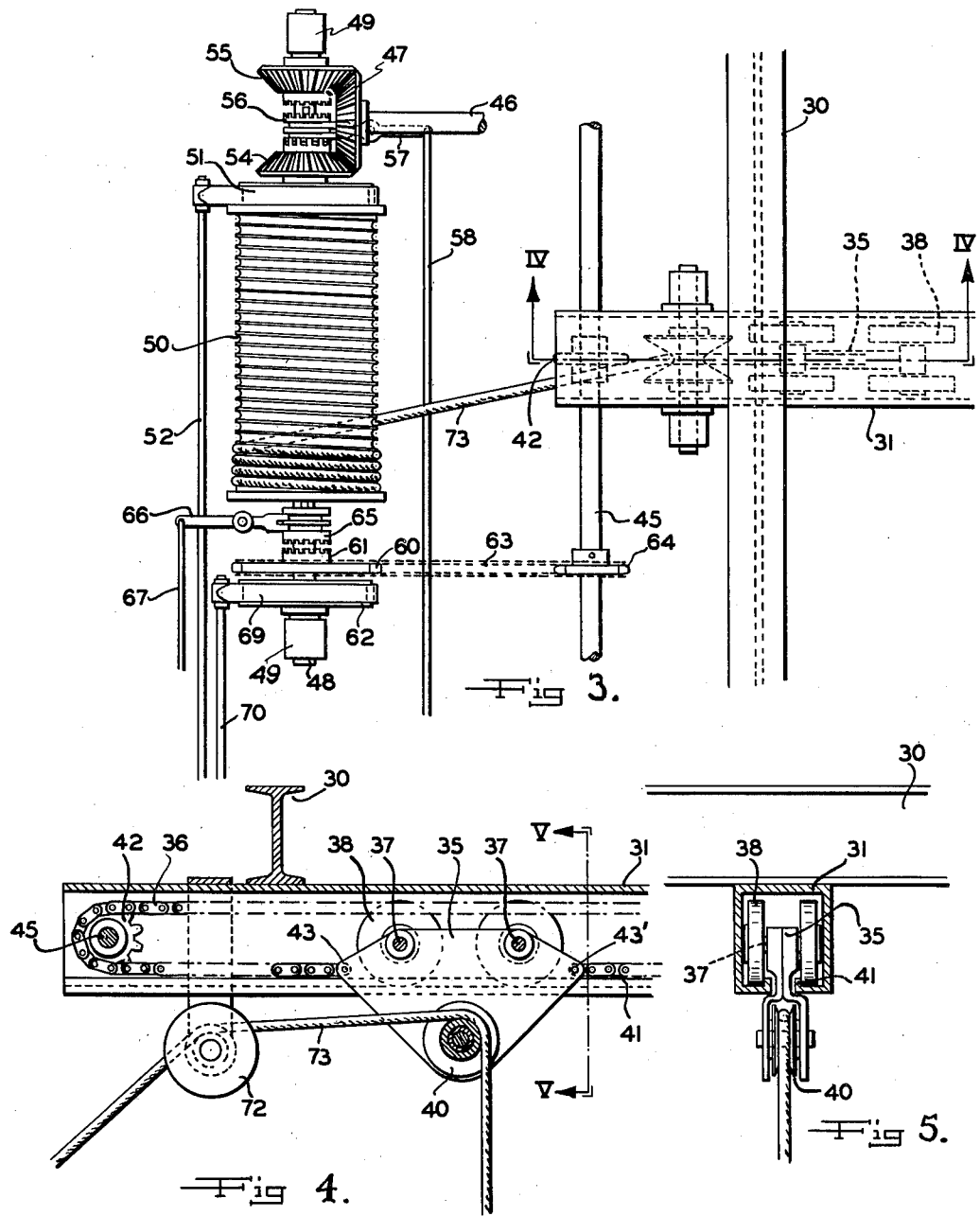

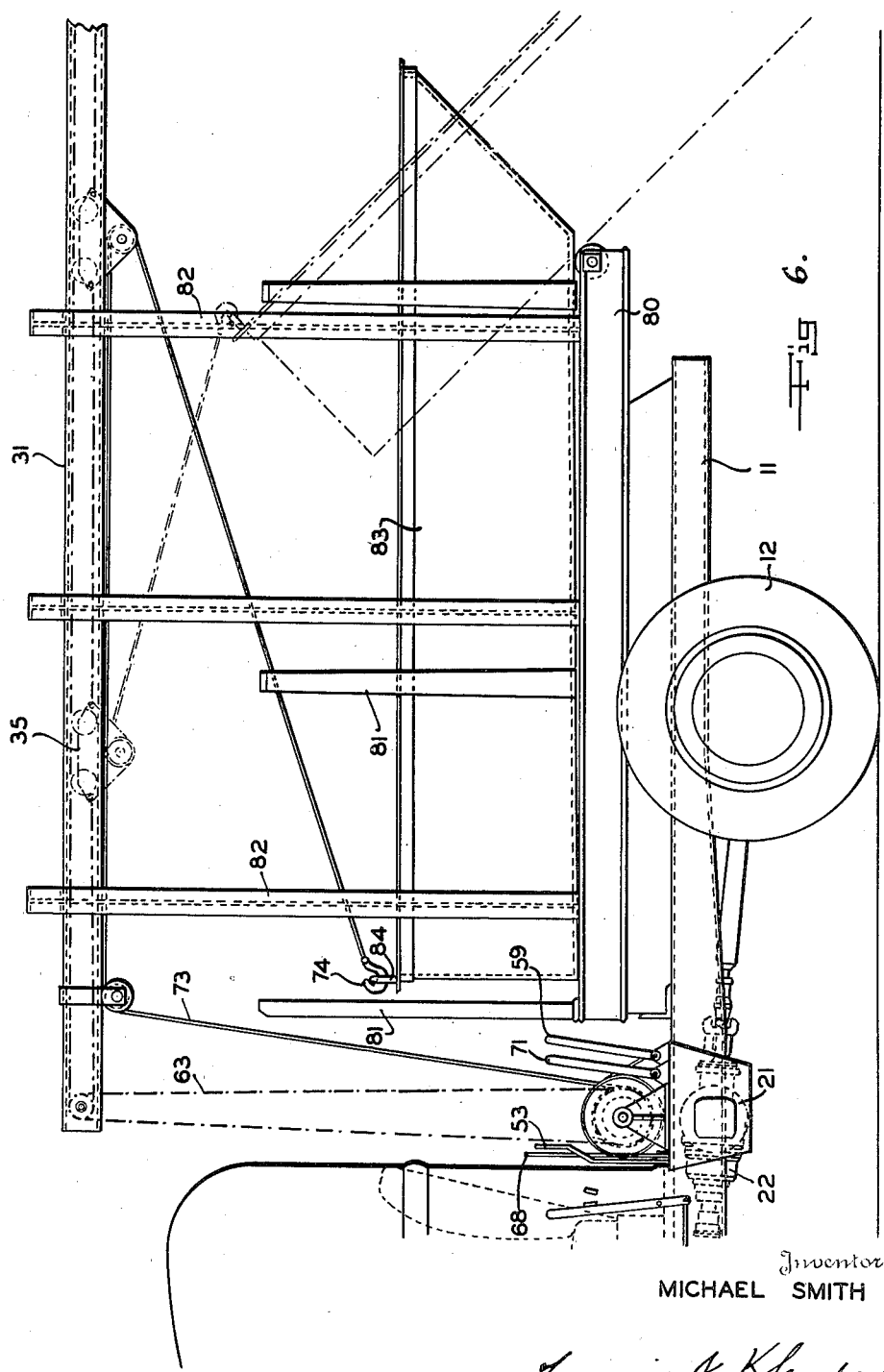

Patented Apr. 18, 1950

2,504,232

UNITED STATES PATENT OFFICE 2,504,232

SELF-LOADING APPARATUS FOR MOTOR TRUCKS

Michael Smith, Youngstown, Ohio

Application May 18, 1946, Serial No. 670,826

1 Claim. (Cl. 212—74)

This invention relates to motor cargo carriers and has to do more particularly with mechanical devices and structures to be employed in utilizing the power of the vehicle's own motor to effect the loading and unloading of the cargo of such carriers.

Various types of hoists, lifts, booms, winches and other mechanical devices have been employed in the past in an effort to accomplish various types of raising and lowering work in connection with automobile "wreckers," self-loading refuse trucks and other specialized types of motor vehicles, but it is believed that a very great need still exists for a practical and economical arrangement of mechanical components which will enable the user to apply the full potential powers of his motor truck to a wide variety of uses in a more economical manner than has been possible heretofore.

The conventional truck body of the "hydraulic-dump" type has, in the past, been used almost exclusively for its intended purpose of hauling and dumping loads of earth, coal, concrete aggregate, etc., and has not lent itself to adaptation to other types of work due to the relatively high and inaccessible design of its body sides. Also it is currently necessary that such truck be loaded by hand or by separate mechanical means, as a power shovel, for example. In accordance with the principles of my invention trucks of this type may be made to serve as transport for machinery, cut stone, coils of wire or any similar unitary objects by the utilization of my improved loading and unloading device. By the addition of a "clam-shell" earth bucket to the machine of the invention, when installed on a dump truck, mechanical self-loading of such materials as earth, slag, gravel etc. may be effected.

The device of the present invention will be found exceedingly useful when employed on motor trucks equipped with so-called "stake side" bodies. As this style of body usually lacks any form of mechanical material handling apparatus its use has been limited in the past largely to applications where loading docks or platforms, set on a level with the bed of the truck, have been available. Use of the apparatus of the present invention will enable operators of either "stake-side" or "flat-body" trucks to load burdens resting on ground level while the additions of a "clam-shell" as mentioned above will adapt "stake-side" trucks to handle coal, earth or other granular material efficiently.

It is therefore a primary object of the present invention to provide improved means for applying the inherent energy of a motor truck power plant to a wider variety of uses than has heretofore been known. Another object is the provision of mechanisms of the class described which shall not hinder the normal functioning of the motor truck on which they are employed.

Yet another object is the provision of apparatus to enable the conversion of one type of truck to uses ordinarily reserved for another. This includes, among other arrangements, the provision of an assembly which may be used in conjunction with a motor truck having a flat or stake body which assembly includes a separable box-like carrier for the hauling and dumping of loose or granulous material. In accordance with the invention, the improved hoisting and moving apparatus is employed to load and to unload the separable carrier or container onto the body of the truck as will be hereinafter more particularly explained.

These and other objects and advantages of the invention will become apparent upon studying the following detailed specification and accompanying drawing wherein there are disclosed two illustrative embodiments of the invention.

In the drawing:

Figure 3 is a plan view of the principal co-acting parts of the machine of the invention;

Figure 4 is a sectional view taken at line IV—IV of Figure 3;

Figure 5 is a sectional view taken at line V—V of Figure 4; and

Figure 6 is a partial side elevation of a combined motor truck and a separable cargo carrier employed in accordance with the principles of the invention.

Figure 1:
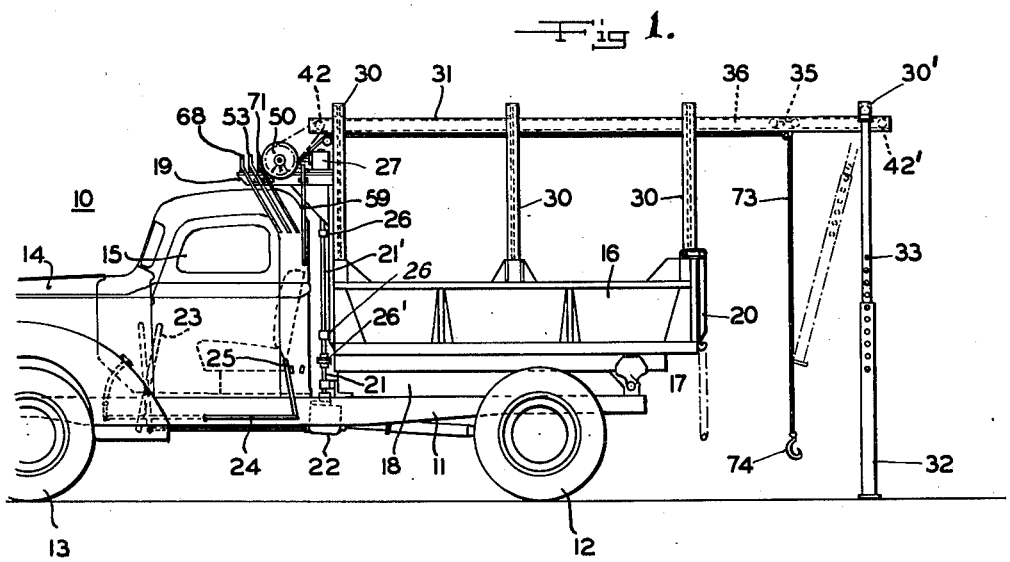
Figure 1 is a side elevation of a truck of the hydraulic-dump type having attached various mechanisms constructed according to the principles of the invention.

Referring to the drawing more in detail, reference numeral 10 indicates a motor truck generally, which truck comprises a chassis 11, rear wheels 12, front wheels 13, a hood 14 housing the motor, an operator's cab 15, and a metal dump body 16 pivoted at 17 to a sub-frame 18 is secured to chassis 11. Attached to the forward end of body 16 and extending upwardly and forwardly is the cab guard 19 which I employ to support certain of the parts of the assembly of the invention as will be presently set forth. Tail gate 20 may be selectively swung up or down as is well understood.

Power for operating the machinery of the present invention is derived from the motor of the truck through the clutch and transmission of the truck and is made to operate a vertically disposed power take-off shaft 21 through the selective take-off gear housing 22 as directed by take-off lever 23.

When power is being transmitted through shaft 21 to drive the apparatus of the invention the action of the gears in housing 22 is such that no motive power will be applied to the wheels of the truck, as will be understood. The truck clutch extension operator 24 is provided to afford remote control over the clutch of the truck by the manipulation of lever 25 and thus to selectively apply or withdraw the power of the motor from shaft 21. A take-off shaft extension 21' is journaled in bearings 26 and is provided to transmit power to bevel gears located in housing 27. A quickly engageable coupling 26' is provided to connect and disengage the ends of 21 and 21' as desired so that body 16 may be raised and lowered in the usual manner of dump truck operation.

Bows 30, formed of light weight steel I beams and having their respective ends attached to both sides of the truck body are employed to support in depending relation, a box-shaped trolley rail 31 at a suitable height above the floor of the truck body 16. Rail 31 may be of any useful length and for use in cases of extremely severe service I prefer to suspend its rearward portion from a transversely situated I beam 30' which beam is supported, at its ends, by two telescopic legs 32. The legs 32 are adjustable axially to insure stability of support on uneven ground and are pivotally attached to beam 30' so that their lower ends may be swung inboard of the truck body for transporting. Suitable pins may be inserted in various of the holes 33 formed in the legs 32 to securely adjust the length of said legs 32.

A trolley hanger 35 is positioned within the box-shaped trolley rail 31 and is caused to travel along said rail by chain 36 in a manner now to be more fully described. For a clearer showing of the remaining elements of the invention attention is directed to Figures 3, 4 and 5.

Trolley hanger 35, referred to above, holds a pair of axles 37 upon each of which is journaled a pair of wheels 38. This entire assembly rolls freely in rail 31, is guided by upturned lips 41, and carries with it, in depending relation the sheave 40 which is journaled between the bifurcated lower extensions of hanger 35. A sprocket wheel 42 is attached to shaft 45 and positioned within rail 31, at its forward end, and is adapted to be rotated by the power transmitting assembly presently to be described. A length of roller chain 36, mentioned above, having its two free ends anchored to trolley hanger 35 at 43 and 43'; is trained thus: from anchorage at 43, on trolley 35 around sprocket 42, thence to the rear end of rail 31, around sprocket 42' which is journaled for free rotation at the extreme rear end of 31, thence to the second anchorage at 43': Chain 36 will thus be seen to urge trolley hanger 35 along rail 31 in either direction, as dictated by the rotation of shaft 45.

As explained above, the power take-off shaft 21 may be made to rotate at the will of the operator and the motion thereof is imparted to the output shaft 46 of the bevel gear assembly 27 via shaft extension 21': Referring now to Figure 3, the output shaft 46 drives the common clutch gear 47.

In the embodiment of the invention illustrated by Figure 1 the gear assembly 27 as well as the other driving and controlling elements of the assembly are mounted on the cab guard 19 of the dump truck body. Such further driving and control elements include a main shaft 48 journaled in pillow blocks 49 and having keyed to its center portion a grooved cable drum 50. Associated with drum 50 is a friction brake 51 operated by a rod 52 by means of a control lever 53. Rotatably mounted on shaft 48 is a pair of opposed bevel gears 54 and 55 arranged to be simultaneously driven, in opposite directions, by the common bevel gear 47 which is keyed on drive shaft 46. Clutch teeth are formed on the inner edges of gears 54 and 55 and feathered on shaft 48, intermediate these gears is a toothed clutch collar 56 arranged to selectively engage either gear 54 or gear 55 by a shift lever 57 arranged to be operated by a rod 58 and control lever 59. Thus, the drum 50 may be rotated in either direction, depending on the shifted position of the collar 56, by the shaft 46.

Also rotatably mounted on the shaft 48 is a sprocket 60 having an integral toothed clutch collar 61 and an integral or attached brake drum 62. Sprocket 60 is adapted to drive the shaft 45 through chain 63 and sprocket 64, the latter being keyed onto shaft 45. For this purpose a toothed clutch collar 65 is feathered on shaft 48 and is arranged to be moved into and out of driving interconnection with collar 61 by means of a shifting lever 66 operated by a rod 67 and a control arm 68. A brake shoe 69 is provided for brake drum 62 and is arranged to be operated by a rod 70 having a manually engageable operating arm 71.

Suspended from the forward end of the rail 31 is a deeply grooved sheave 72 and a cable 73 has its forward end mounted on the drum 50 and its intermediate portion entrained over sheave 72 and pulley 40 on trolley 35. The rear end of the cable 73 is connected to any of the implements mentioned initially above as, for example, a hook 74. Considering now the operation of the hoisting and transporting mechanism thus far described, it should be apparent that if the sprockets 42 and 64 are made identical and the sprocket 60 has the same pitch diameter as the pitch diameters of the convolutions of the drum 50 the cable 73 and the trolley hanger 35 will both move in the same direction and at the same speed upon interengagement of collars 61 and 65, assuming that the collar 56 is interlocked with either of the gears 54 or 55. Thus, to load an object by means of hook 74 onto body 16 of the truck in Figure 1 the lever 23 is first moved to divert the power from the running truck engine to the power take-off 22 and after connection of the hook to the load the lever 59 and the truck clutch extension lever 25 may be manipulated to hoist the load to elevated position as will be understood. Upon the load being properly elevated levers 68 and 71 may be manipulated in sequence to interconnect collars 61 and 65 and to release brake on sprocket 60 whereby the trolley hanger 35 and the cable 73 will move forwardly together to position the load above the load carrying deck of the body 16. Upon the proper horizontal position being reached brake 69 is reapplied, collar 65 declutched, and collar 56 reversed to lower the load onto the deck while the trolley hanger 35 remains stationary as will be understood.

While I have shown separate and simplified controls for the motor truck clutch, the brakes 51 and 69, and the clutch collars 55 and 65 it should be understood that suitable operation simplifying interconnections may be added as desired. For example, it is entirely possible to so interconnect the shifting lever 66 and the brake 69 that the latter is always applied automatically when the collar 65 is disengaged. The same is true as regards the collar 56 and brake 51.

Figure 2:
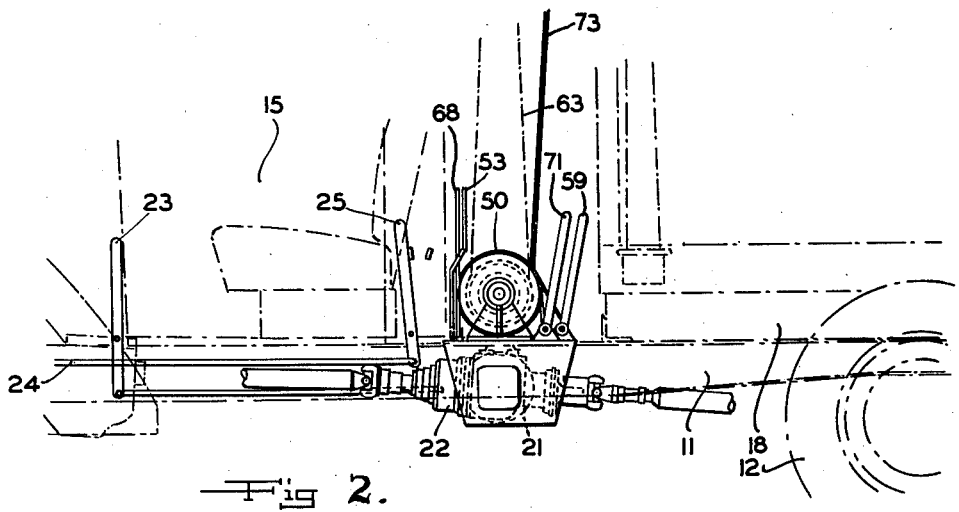
Figure 2 is a fragmentary side elevation of an assembly of the machinery of the invention illustrated as being installed on a truck of the "stake-side" style.

In the embodiment of the invention illustrated in Figures 2 and 6 the drum 50 and associated mechanism is mounted directly on the truck frame 11 intermediate the cab and body and the control levers are regrouped for ease of manipulation. It should be understood that in the embodiment of Figure 1 the normal functioning of the dump body 16 is not interfered with since upon lifting of the forward end of the body by the hydraulic lift, not shown, the coupling 26' simply separates. In practice, this coupling may be simply a large toothed affair as will be understood.

The embodiment of Figure 6 illustrates a further advantageous use of the principles of the invention in converting a standard flat or stake bodied truck into a dump truck. In this figure reference numeral 80 designates the flat body having stakes 81. Rail 31 is supported by the bows 82 and arranged to be positioned within the stakes 81 and the bows 82 is a large open-topped box or container 83 having a hook engaging eye 84 at its forward end. The loading mechanism of this invention may be used to load the container 83 onto the body 80 by first elevating the forward end of the container and then moving the same forwardly in the manner indicated in dotted lines in Figure 6. The container may now be loaded with loose, granulous, or other materials by any suitable external means or by use of the loading mechanism of the invention through the employment of a grab-bucket, for example, attached to the outer end of the cable 73. Upon the load reaching its destination the container 83 may be emptied by sliding it off the truck by means of the mechanism of the present invention in an obvious manner as suggested by the full lines in Figure 6.

The above specifically described embodiments of the invention should be considered as illustrative only as obviously many changes may be made therein without departing from the spirit or scope of the invention. Reference should therefore be had to the appended claim in determining the scope of the invention.

What I claim is:

A loading and unloading attachment for a motor truck having a load-bearing deck comprising in combination a frame-work extending above said deck, a rail suspended from said frame-work longitudinally above said deck and extending longitudinally beyond one end of said deck and frame-work, a sprocket journaled at each end of said rail, a trolley hanger movable along said rail intermediate said sprockets, a cable sheave journaled on said hanger, a cable sheave suspended from said rail adjacent the forward end thereof, a cable-receiving drum journaled on said motor truck, a cable received on said drum and entrained over said sheaves, a link chain entrained over said sprockets and having its ends connected to said trolley hanger, a power take-off and means to drive said take-off by the motor of the truck, a clutch and reverse gear assembly interconnecting said take-off and said drum whereby said drum may be rotated in either direction, a driving gear connected to one of said sprockets, and a clutch interconnecting said drum and said driving gear whereby said sprockets may be driven at a speed synchronized with the movement of said cable.

MICHAEL SMITH.

REFERENCES CITED

The following references are of record in the file of this patent:

UNITED STATES PATENTS

| Number | Name | Date |
|---|---|---|
| 184,848 | Dow | Nov. 28, 1876 |
| 916,324 | Kastendike | Mar. 23, 1909 |
| 1,025,287 | Mattson | May 7, 1912 |
| 1,318,467 | Travell | Oct. 14, 1919 |
| 1,337,667 | Reynolds | Apr. 20, 1920 |
| 1,359,296 | Van Inman | Nov. 16, 1920 |
| 1,391,109 | Haubert | Sept. 20, 1921 |
| 1,635,338 | Otterson | July 12, 1927 |
| 2,405,299 | Godwin | Aug. 6, 1946 |